May 7, 1929.　　　　L. L. BUTLER　　　　1,711,875
QUICK TIRE CHANGE DEVICE
Filed July 3, 1928

L. L. Butler Inventor
By Emil F. Lange
Attorney

Patented May 7, 1929.

1,711,875

UNITED STATES PATENT OFFICE.

LEONARD L. BUTLER, OF LINCOLN, NEBRASKA, ASSIGNOR OF ONE-HALF TO ERNEST ALFRED WILLNER, SR., OF LINCOLN, NEBRASKA.

QUICK-TIRE-CHANGE DEVICE.

Application filed July 3, 1928. Serial No. 290,196.

My invention relates to devices for quickly changing the tires of automobile wheels and its primary object is the provision of a device for quickly accomplishing this result with the expenditure of very little energy.

Another of my objects is the provision of a device whereby all of the rim lugs of the automobile wheel may be released simultaneously and with one movement of the arm.

Another object which I have in view is the provision of mechanism whereby the rim lugs may be quickly forced against the rim in a manner such that all of the rim lugs will exert a substantially equal pressure against the rim.

While I have in view the greatest possible degree of simplicity in operation, it is also my object to so construct the device that it will be of the least possible weight and at a relatively low cost consistent with the results accomplished by it.

Having in view these objects and others which will be pointed out in the following description, I will now refer to the drawings, in which Figure 1 is a view in elevation of an automobile wheel having my device secured thereto.

The felly of the automobile wheel is in channel form having an outer wall 10 and an inner wall 11 with a base portion 12. The common construction of automobile fellies and rims includes a plurality of lugs similar to the lug shown at 13. In the ordinary construction, however, these lugs are secured to the felly by means of bolts or nuts which are loosened or tightened in succession so that the work of releasing or tightening them is multiplied by the number of lugs which are to be released or tightened.

Figure 4:
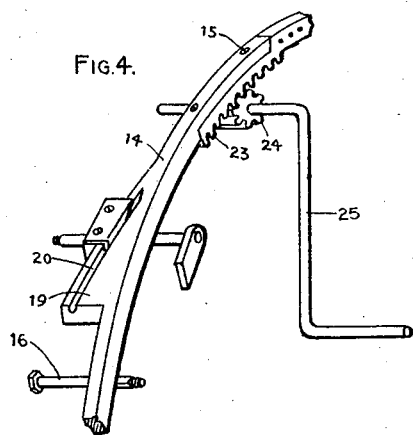
Figure 4 is a view of a section of the annular band and its connections.
Figure 5:
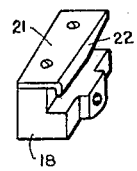
Figure 5 is a view of the laterally slidable wedge block which cooperates with the band for moving the rim lugs inwardly and outwardly.
Figure 7:
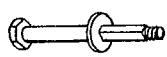
Figure 7 is an illustration showing one of the pins on which the band travels.

In my novel construction I employ an annular band 14 within the felly and spaced but slightly from the outer wall 10. This annular band may be formed from a plurality of arcuate sections but since it is preferably formed from resilient steel, it is possible to construct it of a single piece of metal which may be sprung over one of the side walls of the felly and its ends then secured together as shown at 15 in Figure 4. The band 14 has a diameter which is slightly greater than that of the base 12 of the felly and in order to space it properly from the base I employ pins 16 as best shown in Figure 7. These pins enter through the wall 11 and they are provided with nut shaped heads and with screw threaded ends to enter suitable apertures in the wall 10. The larger portion of the pin is round but it is provided with flat surfaces at the portion supporting the band 14, the screw threaded portion having a slight shoulder adjacent the flat surface portion. These pins 16 maintain the proper circumferential relation of the band 14 and they furnish excellent supports for the movement of the band. The washer on the pin prevents lateral displacement of the band.

Figure 1:
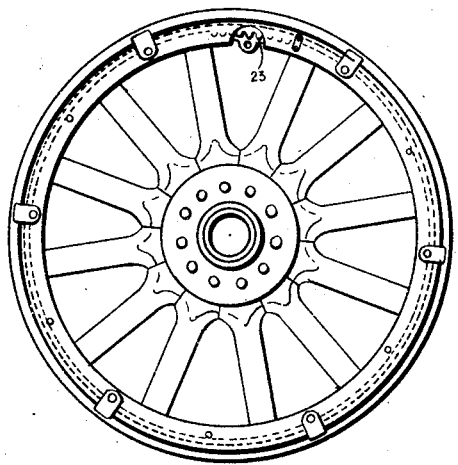
Figure 2:
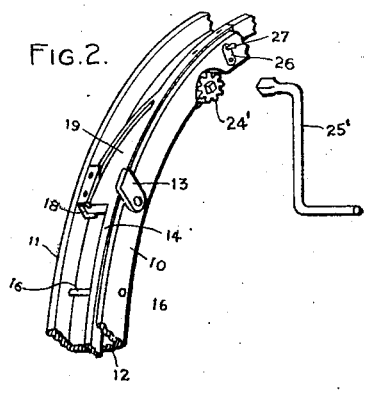
Figure 2 is a view in perspective of a portion of the felly and of my device, the parts being in the position which they occupy when the rim lugs are drawn tight.
Figure 3:
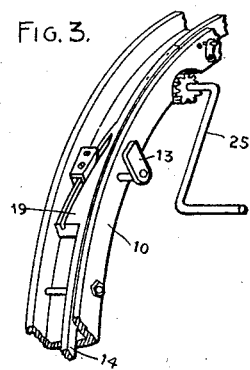
Figure 3 is a view similar to Figure 2 but showing the rim lugs released and showing also a modified form of actuating device.
Figure 6:
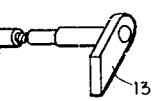
Figure 6 is an illustration showing the rim lug and the pin for holding it in place in the wheel felly and in the wedge block.

The rim lugs 13 are each provided with a stepped pin having first a portion supporting the band 14, then a reduced portion as shown in Figure 6 and finally a screw threaded portion for receiving the collar nut 17. The reduced portion of the pin passes through a suitable aperture in the wedge block 18. The annular band 14 is provided with a plurality of wedge shaped projections 19, there being one projection 19 for each rim lug 13. The wedge block 18 is formed so that it practically embraces the projection 19 as shown in Figure 2. The projection 19 is provided with a groove 20 and the wedge block 18 has secured thereto a plate 21 having a downturned lip 22. This lip 22 projects downwardly into the groove 20 and it is evident that the movement of the band 14 will cause the wedge block 18 to move either inwardly or outwardly and to carry the rim lug with it.

The annular band 14 is provided with a rack 23 on its underside and this rack cooperates with the pinion 24 which in turn is actuated by the crank 25. By turning the crank 25 through a limited extent in one direction or the other, the annular band 14 is moved in a circumferential direction carrying with it all of the rim lugs 13 to closing or releasing position. It is obvious that numerous other forms or devices might be used to actuate the pinion 24 and for this reason I have shown an optional form. It is understood, of course, that the crank 25 is removable and this may be accomplished by making the pinion and the hook handle separable so that it is possible to withdraw the crank handle to leave the pinion in place. It is likewise possible to make the pinion 24 integral with the handle 25 so that the handle 25 and the pinion 24 may be shoved into place with the pinion 24 in engagement with the rack 23. In Figure 2 is shown still another construction. The pinion 24' is permanently in engagement with the rack but it is provided with a nut-like projection which may be engaged by a handle 25' having a socket end. With this construction it is possible to actuate the pinion 24' by means of a wrench or pair of pliers in case the handle 25' becomes lost or misplaced.

The friction is ordinarily sufficient to hold all of the rim lugs 13 in their closed position but it is desirable that additional means be provided for preventing the vibration of the car from causing the slipping of the band and thus loosening the rim lugs. This may be accomplished by the use of any one of numerous devices of which I have shown one. A spring clip 26 is secured to the wall 10 and the clip is provided with a pin 27 which is adapted to enter suitable apertures in the wall 10 and in the annular band 14 when the rim lugs are in their tightened relation.

The invention and the advantages of the device will be obvious from the foregoing description. When it is desired to change the tire, it is only necessary to apply the crank handle 25 and to turn it through a relatively small arc in order to release all of the rim lugs simultaneously. The pins on the rim lugs have a pivotal relation with the felly and with the wedge blocks so that some of these rim lugs may be turned by hand through a small arc in order to release the rim. When the rim is replaced on the felly a single short turn of the crank handle 25 will tighten all of the rim lugs 13 simultaneously with an equal pressure on all of the rim lugs.

Having thus described my invention in such full, clear, and exact terms that its construction and operation will be readily understood by others skilled in the art to which it pertains, what I claim as new and desire to secure by Letters Patent of the United States is:

1. In combination with the felly of an automobile wheel, a plurality of rim lugs having pins secured thereto, said pins projecting into said felly, an annular band surrounding said felly and slidable circumferentially thereon, wedge shaped members projecting laterally from said band, and laterally slidable wedge blocks having circumferentially slidable connection with said wedge shaped members, said wedge blocks being secured to said pins whereby the lateral movement of said wedge blocks causes the movement of said rim lugs to releasing or closing position.

2. In combination with the felly of an automobile wheel, an annular band surrounding said felly, rim lugs having pins passing transversely through said felly, wedge shaped members projecting laterally from said band, laterally movable wedge blocks movably secured to said wedge shaped members and secured also to said pins, and means for shafting said band circumferentially to advance or retract said pins and said rim lugs.

3. In combination with the felly of an automobile wheel, an annular band surrounding said felly and spaced therefrom, rim lugs having pins passing transversely through said felly, laterally movable wedge blocks secured to said pins, wedge shaped members projecting laterally from said band and integral therewith, connections between said wedge blocks and said wedge shaped members permitting relative movement therebetween in a circumferential direction, and means for moving said band in a circumferential direction on said felly.

In testimony whereof I affix my signature.

LEONARD L. BUTLER.